Nov. 24, 1925.
C. FRANZ, JR
1,562,951
SCREW FOR LOOSE LEAF BINDERS
Filed Sept. 17, 1923
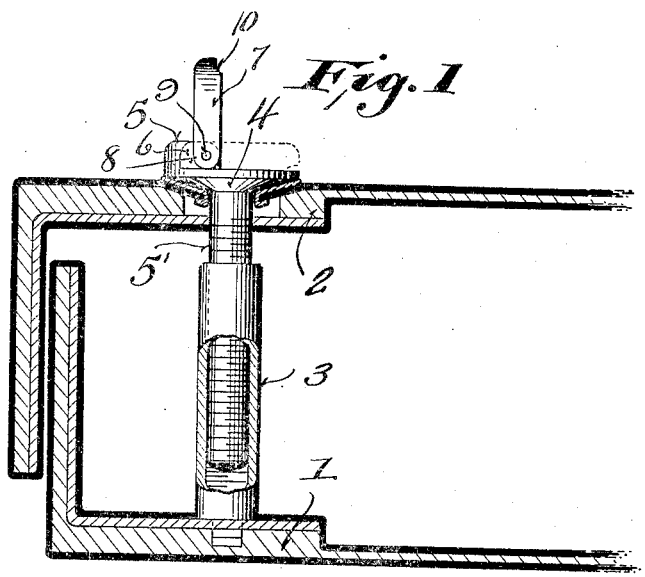
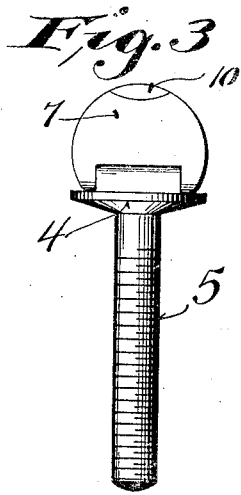
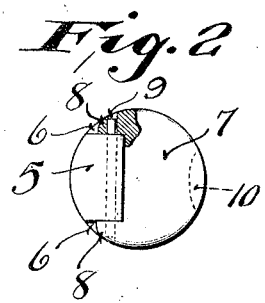
Witness:
R. E. Weber
Inventor:
Charles Franz Jr.
Young & Young
Attorneys Patented Nov. 24, 1925.

1,562,951

UNITED STATES PATENT OFFICE.

CHARLES FRANZ, JR., OF MILWAUKEE, WISCONSIN, ASSIGNOR TO THE HEINN COMPANY, OF MILWAUKEE, WISCONSIN.

SCREW FOR LOOSE-LEAF BINDERS.

Application filed September 17, 1923. Serial No. 663,179.

*To all whom it may concern:*

Be it known that I, CHARLES FRANZ, Jr., a citizen of the United States, and resident of Milwaukee, in the county of Milwaukee and State of Wisconsin, have invented certain new and useful Improvements in Screws for Loose-Leaf Binders; and I do hereby declare that the following is a full, clear, and exact description thereof.

This invention relates to screws and is particularly directed to screws which are frequently handled, such, for instance, as the screws employed in loose leaf binders.

Objects of this invention are to provide a screw which has a head so constructed that the screw may be easily manually manipulated, which is provided with a movable flap forming a portion of its head and so associated with the head that it forms a finished head when not in use, and which will not scratch or mar desks or table tops upon which it may be placed.

An embodiment of the invention is shown in the accompanying drawings, in which:—

Figure 1 is a fragmentary vertical sectional view through a loose leaf binder showing the screw in position for manual manipulation.

Figure 2 is a top view of the head of the screw showing the manipulating portion in its normal or inactive position.

Figure 3 is a view of the screw detached, such view being taken at right angles to Figure 1.

While this screw is useful in a large number of places, it is particularly useful in loose leaf binders and accordingly a portion of such binder with the screw in position has been shown.

The binder comprises reenforcing portions 1 and 2, one of which is provided with an upstanding internally threaded tube 3. The screw comprises a head composed of a main body portion having lower conically shaped portion 4, a thread extension 5' projecting therefrom and engaging the internal threads of the tube 3. This screw is passed through the upper portion 2 of the binder and serves to draw such upper portion towards the lower portion. The main or body portion of the head is provided with a recessed portion, that is to say, it is cut away so as to leave an upwardly projecting part 5 having a rounded inner edge and having flat end faces 6.

The relatively movable portion comprises a flap 7 which completes the outline of the head and has its outer surface normally flush with the outer surface of the portion 5. This flap is provided with rearwardly extending ears 8 which are pivotally secured to the portion 5 by means of a pintle 9. One of the members, for instance, the movable flap 7 is provided with a recess 10 adapted to receive the nail of the operator so that such flap may be readily moved to its upstanding position as shown in Figure 1.

The operation of the apparatus is as follows: When it is desired to rotate the screw, it is merely necessary to insert a finger nail into the recess 10 and raise the flap 7 into the position shown in Figure 1. When in this position, the flap may be readily manually gripped and the screw 5 may be easily rotated.

It is to be particularly noted that with this type of screw a finished or flush head is provided which will not scratch desks or table tops and also provides an attractive and pleasing appearance.

It is further to be noted that the peculiar construction of the head enables such head to be readily manually manipulated without the necessity of employing additional implements or tools to rotate the screw.

Although one form of the invention has been described in considerable detail, it is to be understood that the invention may be variously embodied and is, therefore, to be limited only as claimed.

I claim:

1. A screw provided with a threaded shank and having a two part head, one of the parts of said head consisting of a disk integral with said screw and having a flat face, the other part of said head consisting of a movable disk having a flat face normally contacting with the first mentioned flat face, said disks being pivoted together and the said flat faces extending to the periphery of said head.

2. A screw having a threaded shank provided with a two part head, one of said parts consisting of a complete circular disk integral with said shank and having an upwardly projecting lug extending inwardly from the peripheral portion of said disk and part way across said disk, the other of said parts consisting of a disk having ears pivotally joined to said lug, such part normally lying flatly upon said first mentioned disk and having its upper surface flush with the upper surface of said lug, said second mentioned disk and said lug, together, forming a flat outer face for said head.

3. The combination of a binder having opposed portions, and internally threaded tube rigid with and extended from one portion towards the other, and a screw extending through the last mentioned portion and screwed into said tube, said last mentioned portion of said binder having a beveled recess and said screw having a head beveled on its under side and seating within said recess, said head consisting of a circular disk integral with said screw shank, and a second disk normally lying flatly upon said first disk throughout its extent and having a pivotal union with said first mentioned disk.

In testimony that I claim the foregoing I have hereunto set my hand at Milwaukee, in the county of Milwaukee and State of Wisconsin.

CHARLES FRANZ, Jr.